United States Patent
Jung et al.

(10) Patent No.: US 10,492,386 B2
(45) Date of Patent: Dec. 3, 2019

(54) AGRICULTURAL AIR INJECTION APPARATUS

(71) Applicants: Pil Ho Jung, Gimhae-si (KR); Jaehwan Jung, Suwon-si (KR)

(72) Inventors: Pil Ho Jung, Gimhae-si (KR); Jaehwan Jung, Suwon-si (KR)

( * ) Notice: Subject to any disclaimer, the term of this patent is extended or adjusted under 35 U.S.C. 154(b) by 0 days.

(21) Appl. No.: 15/773,106

(22) PCT Filed: Nov. 2, 2016

(86) PCT No.: PCT/KR2016/012526
§ 371 (c)(1),
(2) Date: May 2, 2018

(87) PCT Pub. No.: WO2017/078400
PCT Pub. Date: May 11, 2017

(65) Prior Publication Data
US 2018/0338437 A1 Nov. 29, 2018

(30) Foreign Application Priority Data
Nov. 3, 2015 (KR) .................. 10-2015-0154035

(51) Int. Cl.
*A01G 29/00* (2006.01)
*A01G 25/06* (2006.01)
(Continued)

(52) U.S. Cl.
CPC ............ *A01G 29/00* (2013.01); *A01C 23/023* (2013.01); *A01C 23/042* (2013.01); *A01G 7/06* (2013.01);
(Continued)

(58) Field of Classification Search
CPC ....... E02B 11/00; E02B 11/005; A01G 13/08; A01G 25/06
(Continued)

(56) References Cited

U.S. PATENT DOCUMENTS 4,293,237 A * 10/1981 Robey .................... A01G 25/06
405/39
4,348,135 A * 9/1982 St. Clair ................ A01G 25/06
405/131
(Continued)

FOREIGN PATENT DOCUMENTS

JP 06-000035 A 1/1994
JP 2000-253762 A 9/2000
(Continued)

*Primary Examiner* — Frederick L Lagman
(74) *Attorney, Agent, or Firm* — Maschoff Brennan

(57) ABSTRACT

Disclosed is an agricultural air injection apparatus including: a compressor for compressing air; an air tank which has a pressure gauge and a safety valve for presenting overpressure and stores compressed air of high pressure in a set pressure condition; a decompression valve for decompressing air pressure discharged from the air tank; a sprayer for spraying water in a particle state in order to make vapor contained in the supplied air; a distributor which uniformly distributes the decompressed air to a plurality of flow paths and has a control valve to open and close the flow paths; an air supply pipe which is buried in the soil where crops to be cultivated will be planted and has pores for supplying air passing through the distributor; and a controller which is connected to the compressor, the pressure gauge of the tank and the control valve of the distributor to control supply of the compressed air.

2 Claims, 2 Drawing Sheets

(51) Int. Cl.
*A01G 13/08* (2006.01)
*E02B 11/00* (2006.01)
*A01G 7/06* (2006.01)
*A01C 23/02* (2006.01)
*A01C 23/04* (2006.01)

(52) U.S. Cl.
CPC ............. *A01G 13/08* (2013.01); *A01G 25/06* (2013.01); *E02B 11/005* (2013.01)

(58) Field of Classification Search
USPC ...................................................... 405/43–45
See application file for complete search history.

(56) References Cited

U.S. PATENT DOCUMENTS

| | | | | |
|---|---|---|---|---|
| 4,527,353 A * | 7/1985 | Newby | ................... | A01G 25/16 222/54 |
| 4,538,377 A * | 9/1985 | Thornton | ............... | A01G 25/06 405/39 |
| 5,200,065 A * | 4/1993 | Sinclair | ................... | C02F 1/006 210/104 |
| 5,433,759 A * | 7/1995 | Benson | .................. | A01B 45/02 47/1.01 R |
| 5,507,595 A * | 4/1996 | Benson | ................... | A01G 25/06 405/269 |
| 6,726,401 B1 * | 4/2004 | Potts | ....................... | E03F 1/002 210/747.1 |
| 7,172,366 B1 * | 2/2007 | Bishop, Jr. | ............. | E01C 13/02 137/78.3 |
| 7,413,380 B2 * | 8/2008 | Corwon | ................... | E01C 13/02 137/78.3 |
| 2005/0063790 A1 * | 3/2005 | Nakakuma | ............. | E02B 11/00 405/302.4 |
| 2009/0052990 A1 * | 2/2009 | Richardson | ............ | A01G 25/06 405/43 |
| 2010/0299994 A1 * | 12/2010 | Kneussle | ............... | A01G 25/06 47/1.01 R |
| 2016/0120118 A1 * | 5/2016 | Bouten | ............... | A01M 7/0092 222/1 |

FOREIGN PATENT DOCUMENTS

| | | |
|---|---|---|
| KR | 20-1998-0003690 U | 3/1998 |
| KR | 10-2010-0030360 A | 3/2010 |
| KR | 10-0958847 B1 | 6/2010 |
| KR | 10-2012-0020512 A | 3/2012 |
| KR | 20-0464414 Y1 | 1/2013 |

* cited by examiner

[Fig. 1]
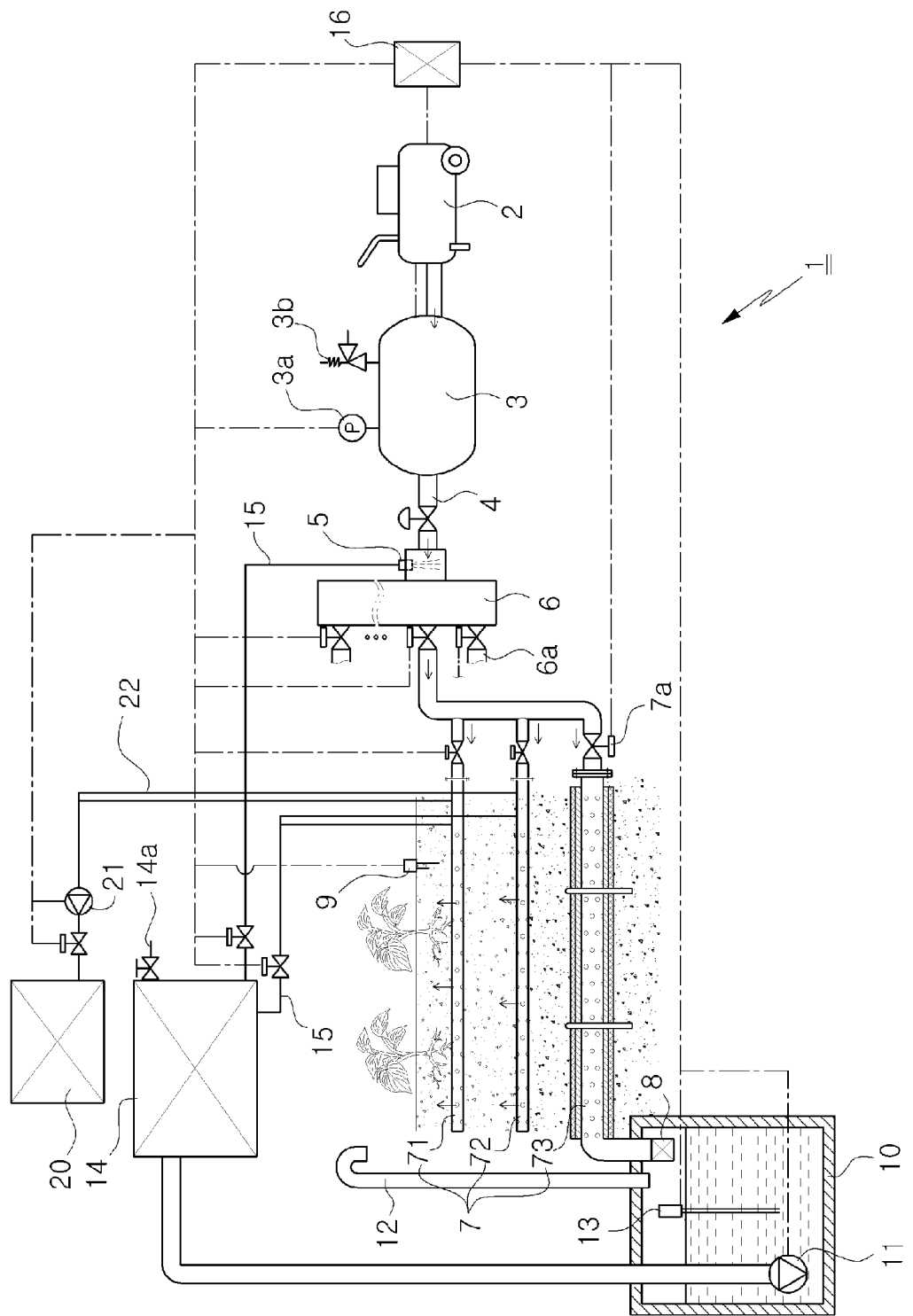

[Fig. 2]
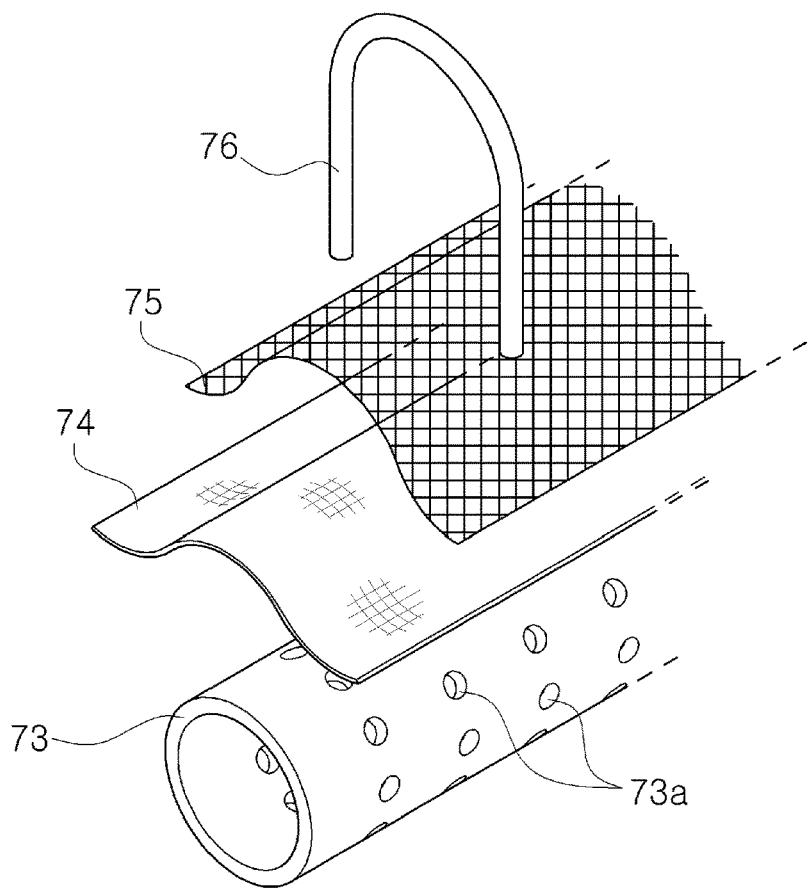
[Fig. 3]
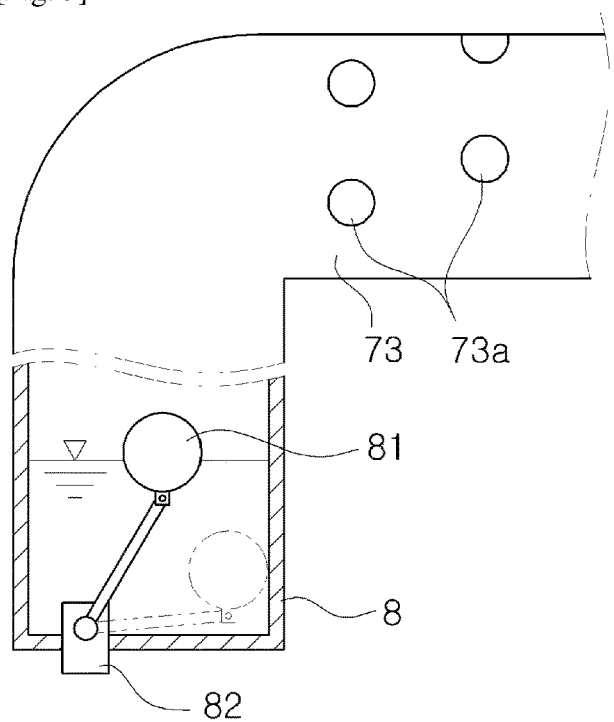

AGRICULTURAL AIR INJECTION APPARATUS

TECHNICAL FIELD

The present invention relates to an agricultural air injection apparatus, and more particularly, to an apparatus for directly injecting air into the soil in order to increase the yield of crops and raise the quality of the crops by propagating aerobic microbes in the field soil.

BACKGROUND ART

Various microbes live in the soil, and especially, aerobic microbes propagate under the condition that oxygen exists decompose and compose organic matters, coexist with the roots of plants to strengthen the roots so that the plants transpire.

As described above, the aerobic microbes, which are useful for cultivating crops, in the soil is decreased in activity and propagation by chemical fertilizers or agricultural pesticides, and it causes the use of more chemical fertilizers and agricultural pesticides in order to increase the yield of crops. Such use of chemical fertilizers and agricultural pesticides not only threatens consumers' health and causes secondary pollution of the soil and underground water but also has bad effect on the ecosystem and environment.

In order to solve the above problems, Korean Utility Model Registration No. 20-0464414 Y1 discloses an air and nutrition supplying apparatus for physically supplying fresh air into the soil. The air and nutrition supplying apparatus 10 buried in a plant habitat for inducing or supplying air and nutrition underground includes: an air and nutrition supplying unit 11 which is buried in the habitat to provide a path to infiltrate induced air and nutrition into the soil; an air supply inducing unit 12 which is disposed at one end of the air and nutrition supplying unit 11 exposed over the ground of the habitat and slantly converts the direction of the air horizontally flowing along the surface of the earth to induce the air to the air and nutrition supplying unit 11; and a discharging unit 14 which is disposed at the other end of the air and nutrition supplying unit 11 to discharge the induced air, nutrition and moisture directly under the discharging unit 14.

However, such an air and nutrition supplying apparatus 10 has several disadvantages in that it cannot smoothly supply air to the depth of the roots because a tube body is buried on the ground and in that air is not smoothly supplied if the inside of the tube body is filled with soil or sand because the apparatus indirectly communicates with the air through a supply tube. Therefore, Korean Patent Laid-open No. 10-2012-0020512 discloses an apparatus for promoting growth of crops having a separate supplying unit.

The apparatus for promoting growth of crops includes: a nutrient solution supplying unit 200 for supplying a nutrient solution (N) to the roots (R) of crops (C) by dripping; an air supplying unit 300 connected to the nutrient solution supplying unit for supplying air to the roots of the crops; a controller 400 connected to the nutrient solution and air supplying units for controlling the supply of the nutrient solution and the air, thereby supplying the nutrient solution and the air to the roots of the crops and supplying air to the entire roots of the crops by supplying the nutrient solution to the roots of the crops by dripping.

The apparatus for promoting growth of crops includes the air supplying unit using driving power, but because supplying members are mounted under the soil near stems of each of the crops in order to locally supply air by dripping, it is difficult to evenly supply air to the entire of the roots of the crops and there is a risk of breakage when a farmer lows or manages an agricultural machine on a farmland.

CITED REFERENCES

Patent Reference 1: Korean Utility Model Registration No. 20-0464414 Y1 (Dec. 24, 2012)
Patent Reference 1: Korean Patent Laid-open No. 10-2012-0020512 A (Mar. 8, 2012)

DISCLOSURE OF INVENTION

Technical Problem

Accordingly, the present invention has been made in an effort to solve the above-mentioned problems occurring in the prior arts, and it is an object of the present invention to provide an agricultural air injection apparatus which propagates aerobic microbes in the soil of a field where crops grow, thereby minimizing use of chemical fertilizers or agricultural pesticides, increasing the yield of crops, raising the quality of the crops, and making a large contribution toward solving secondary ecosystem environment problems as well as pollution problems of soil and underground water.

It is another object of the present invention to provide an agricultural air injection apparatus which includes an air injection line buried in the soil without being exposed above the ground of the field, thereby evenly supplying air to the entire roots of the crops and optimizing moisture content in the soil through the air injection line.

Other objects of the present invention will be additionally considered within the range easily deducible from the following detailed description and the effects.

Solution to Problem

To achieve the above objects, the present invention provides an agricultural air injection apparatus including: a compressor for compressing air; an air tank which has a pressure gauge and a safety valve for presenting overpressure and stores compressed air of high pressure in a set pressure condition; a decompression valve for decompressing air pressure discharged from the air tank; a sprayer for spraying water in a particle state in order to make vapor contained in the supplied air; a distributor which uniformly distributes the decompressed air to a plurality of flow paths and has a control valve to open and close the flow paths; an air supply pipe which is buried in the soil where crops to be cultivated will be planted and has pores for supplying air passing through the distributor; and a controller which is connected to the compressor, the pressure gauge of the tank and the control valve of the distributor to control supply of the compressed air.

Moreover, in order to intensively supply air, moisture and fertilizer by stages as crops grow, the air supply pipe includes: a first temporary pipe and a second temporary pipe which are buried to a low depth in the soil and are branched at different depths to directly supply air to the roots of the crops; a drain pipe and a liquid fertilizer supply pipe which are respectively piped to the first temporary pipe and the second temporary pipe to supply water and liquid fertilizer if necessary; a fixed pipe which is fixed and mounted in the soil to be deeper than the temporary pipes; and a nonwoven fabric which surrounds the outer circumference of the fixed pipe and a wire mesh put on the outer surface of the nonwoven fabric in order to block inflow of foreign matters into the fixed pipe and prevent blocking of the pores.

Advantageous Effects of Invention

As described above, the agricultural air injection apparatus according to the present invention has various effects as follows.

First, the agricultural air injection apparatus according to the present invention does not interrupt management of an agricultural machine or plowing because it is not exposed onto the ground, thereby allowing a farmer to easily cultivate land and evenly supplying air to the entire of the roots of crops.

Second, the agricultural air injection apparatus according to the present invention promotes propagation and activities of aerobic microbes through a continuous air supply at constant pressure, thereby raising the quality of crops, remarkably raising the yield of the crops because being resistant to diseases and insects, helping production of healthy crops by making organic and pesticide-free cultivation possible, and contributing to environment protection and creation of healthy ecosystem environment by reducing environmental pollution caused by agricultural pesticides.

Third, the agricultural air injection apparatus according to the present invention can recycle resources by supplying rainwater, which was collected through underground pipes, through an air supply pipe in dry season.

Fourth, the agricultural air injection apparatus according to the present invention can prevent flooding by making drainage smooth through the underground pipes, which supply air, in the rainy season so as to minimize moisture injury.

BRIEF DESCRIPTION OF DRAWINGS

FIG. 1 is a schematic diagram of an agricultural air injection apparatus according to the present invention.

FIG. 2 is a perspective view showing a structure of an air supply pipe.

FIG. 3 is a sectional view showing a structure of a water tank.

MODE FOR THE INVENTION

Reference will be now made in detail to the preferred embodiments of the present invention with reference to the attached drawings. In the description of the present invention, when it is judged that detailed descriptions of known functions or structures related with the present invention may make the essential points vague, the detailed descriptions of the known functions or structures will be omitted.

Because there is need to supply the roots of plants with oxygen of a predetermined quantity in order to cultivate the plants, farmers plow directly before cultivating crops so as to form pores in the soil where the plants will root, so that air comes into contact with the soil. When rice straws or sawdust are put in the pores so as to aerate the soil.

While the crops are cultivating and rooting actively, the crops need more oxygen to grow up, but because the pores are stopped as time goes by, supply of oxygen is decreased. Therefore, in order to overcome the above problem, the present invention provides an agricultural air injection apparatus which includes an air supply pipe 7 buried under the roots of the crops to propagate aerobic microbes near the roots, thereby raising the yield of the crops.

FIG. 1 is a schematic diagram of an agricultural air injection apparatus according to the present invention. The an agricultural air injection apparatus according to the present invention includes: a compressor 2 which compresses air at high pressure of 10 bar or more using driving power of a motor; and an air tank 3 which is connected with the compressor 2 to store the compressed air at high pressure.

The air tank 3 includes a pressure gauge 3a and stores the compressed air in a preset pressure condition. If pressure exceeding the preset pressure is applied to the air tank 3, excessive pressure is automatically discharged out through a safety valve 3b mounted on the air tank 3, and if pressure inside the air tank is less than the preset pressure, the compressor 2 is automatically operated to uniformly keep the inside pressure of the air tank 3.

The air supplied toward the roots of the crops is decompressed to the preset pressure through a decompression valve 4 mounted at the front of the air tank 3, and then, is discharged at pressure higher than atmospheric pressure, and in this instance, the air tank 3 is designed to smoothly supply air in consideration of the depth of the air supply 7 buried in the ground at pressure of 1.01 bar or more according to soil conditions. Besides the above-mentioned decompression valve 4, decompression units of various kinds which have been known may be used to decompress the compressed gas of high pressure to the preset pressure.

The air passing through the decompression valve 4 is introduced into a distributor 6, which has a plurality of flow paths and control valves 6a for controlling opening and closing of the flow paths. The number of the flow paths and the number of the control valves 6a can be properly increased or decreased according to the size and the quantity of fields where the air injection apparatus 1 is buried. That is, even though crops of a single species are cultivated, if the cultivation area is wide, it is effective to distribute compressed air using the flow paths of an appropriate quantity, and it is good to effectively control distribution of air by blocking the air using the control valves 6a in the area where seedlings are not planted yet.

A sprayer 6 for spraying water in a particle state before distribution to the flow paths may be mounted between the compression valve 4 and the distributor 5 or inside the distributor 6. The reason is to supply saturated air, which contains moisture, near to the roots in a dry environment. In this instance, a water tank for supplying moisture may be an exclusive water tank or the sprayer 5 may be connected with a ground water tank 14 through a pipe to receive moisture from the ground water tank 14 as shown in FIG. 1.

The air supply pipe 7 branched from the distributor 6 is buried in the soil where crops to be cultivated will be planted, and includes a fixed pipe 73 and temporary pipes which are mounted to different depths in the vertical direction.

Referring to the drawings, the air supply pipe 7 buried and mounted under the soil where the crops are planted includes: a first temporary pipe 71 buried to the depth of about 10 cm to 20 cm; a second temporary pipe 72 mounted to the depth of about 30 cm from the ground; and the fixed pipe 73 buried to the depth of about 50 cm or less, and of course, the number of the temporary pipes may be increased or decreased properly by those skilled in the art.

The air supplied from the air tank 3 and water and nutrients of the ground water tank 14 and a fertilizer tank, which are located on the ground, are supplied to the air supply pipe 7.

Fertilizer and water can be periodically supplied through a timer, and preferably, for more systematic management, a soil measuring device 9 is buried in the soil to sense humidity of the soil and concentration of the fertilizer and supply fertilizer and water by opening the valve only when humidity of the soil and concentration of the fertilizer are lower than set values.

The temporary pipes are easily buried to a low depth to directly supply air, moisture and fertilizer to the roots of the crops. Therefore, the temporary pipes may be made of synthetic resin which is inexpensive and can be removed when the crops are harvested. However, the fixed pipe 73 which is buried the lowest is semipermanently buried to the depth of about 50 cm or more to promote activities of aerobic microbes through a constant supply of air to the bottom layer.

As shown in FIG. 2, in order to prevent that the pores 73a of the fixed pipe 73 buried deeply is blocked by soil or stones, the air supply pipe 7 further includes: a nonwoven fabric 74 or textile which surrounds the outer surface of the fixed pipe 73 so as to be well ventilated; a wire mesh 75 put on the outer surface of the nonwoven fabric (74) so as to smoothly supply air without stoppage; and a U-shaped fixing pin 76 mounted on the wire mesh 75 to surround the wire mesh 75 and the fixed pipe 73 in order to fix the positions of the wire mesh and the fixed pipe stably.

The fixed pipe 73 functions not only to supply air but also to rapidly and smoothly drain water when excessive water is introduced into the field in the rainy season or heavy rain period.

For this, a water tank 8 for collecting rainwater induced into the pores 73a of the fixed pipe 73 is disposed at the front end of the fixed pipe 73. The water tank 8 includes a floating valve 82 to which a float 81 is connected so that the valve is automatically opened when water of a predetermined amount is collected. As shown in FIG. 3, when the water tank 8 is filled with rainwater, the valve 82 is opened by a link connected to the float 81 floating on the surface of the water.

The rainwater drained from the water tank 8 is collected to an underground water tank 10 buried under the ground. The underground water tank 10 includes: an air vent 12 which is exposed to the ground in order to control pressure inside the water tank and ventilate; a water level sensor 13 for measuring the water level of the rainwater introduced into the underground water tank 10; and an underground water pump 11 mounted in the underground water tank 10 and operated when rainwater reaches the set water level to discharge the rainwater to the ground water tank 14.

As described above, the agricultural air injection apparatus according to the present invention can prevent moisture injury of the crops by smoothly draining water of the soil through the fixed pipe 73 buried in the soil and recycle the drained water in the dry season.

In other words, the agricultural air injection apparatus according to the present invention can directly supply moisture toward the roots of the crops in the dry season without using top water because the drain pipe 15 for supplying water to the temporary pipes or the sprayer 5 is connected to the lower end of the ground water tank 14, and can receive and utilize water from the outside through a water supply pipe 14a if there is no water supplied from the underground water tank 10.

Hereinafter, operation, actions and effects of the agricultural air injection apparatus 1 according to the present invention will be described.

Seedlings or seeds of crops to be cultivated are planted furrows formed through plowing using farming tools, such as a tractor. In the stage that buds start to sprout, because the air layer above the ground is adjacent to the roots, there is no need to use the air supplying unit. Accordingly, the air injection apparatus 1 according to the present invention is not used.

When the crops grow to about 10 cm, in the first stage, in order to make rooting smooth and supply sufficient nutrients, the first temporary pipe 71 is buried to the depth of about 15 cm below the crops so as to supply air.

Crops are generally delayed in growth of the roots when the roots of the crops grow to about 20 cm. The reason is that aerobic soil microbes are not sufficiently propagated in the soil because the roots of the crops are in a symbiotic relationship with microbes in the soil.

Therefore, in the second stage, the second temporary pipe 72 is mounted to the depth of about 30 cm from the ground for directly supplying nutrients together with air so as to promote growth of the roots. A controller remotely opens an air pipe valve 7a of the second temporary pipe 72 to supply air, and in this instance, the air is constantly supplied for 24 hours at set pressure of more than 1.05 bar which is slightly higher than atmospheric pressure so as to create the environment that aerobic microbes can actively propagate in a natural condition.

Water and fertilizer may be supplied to the temporary pipes to promote the growth of the crops more. A soil measuring device 9 is buried in the soil to monitor humidity of the soil and concentration of the fertilizer through the controller, and then, if necessary, water and fertilizer are supplied by the valve remotely opened and closed.

If fertilizers are sprayed above the crops, it has a marginal effect compared with an input because the roots absorb nutrients of a small quantity and there are lots of loss amounts, it causes the growth of weeds and fertilizers infiltrated into the soil pollute underground water and soil. However, if fertilizers are directly injected to the roots through the temporary pipes, the roots of the crops absorb the fertilizers effectively, and it reduces waste of the fertilizers and minimizes secondary environmental pollution.

The air supplied from the fixed pipe 73 fixed under the temporary pipes activates propagation and activities of the aerobic microbes so that the remaining fertilizers and agricultural pesticides which are not absorbed can be decomposed and the roots growing in proportion to the amounts of the microbes living in the soil absorb the nutrients infiltrated into the soil so as to increase production of the crops.

In the meantime, in a region with a great deal of precipitation, rainwater is induced into the pores 73a formed in the fixed pipe 73 buried under the soil and is collected into the underground water path through the water tank mounted at the end portion of the fixed pipe so that the roots of the crops are submerged in water. Therefore, the air injection apparatus according to the present invention can minimize a decline of the crops due to lack of oxygen in the soil in the excessive moisture condition of the soil. Furthermore, the air injection apparatus according to the present invention can recycle water resources because supplying water through the drain pipes 15 in the dry season by pumping the rainwater, which was induced into the underground water tank 10, up to the ground water tank 14.

As described above, while the present invention has been the most desirably shown and described with reference to the preferable embodiment thereof, it will be understood by those of ordinary skill in the art that various changes and modifications may be made therein without departing from the technical idea and scope of the present invention. Therefore, it will be understood by those of ordinary skill in the art that the protective scope of the present invention is not limited to the above embodiment and covers technologies described in the claims of the present invention and equivalences obtained from the technologies.

INDUSTRIAL APPLICABILITY

The present invention is industrially applicable as an agricultural air injection apparatus.

The invention claimed is:

1. An agricultural air injection apparatus comprising:
   a compressor for compressing air;
   an air tank which has a pressure gauge and a safety valve for presenting overpressure and stores compressed air of high pressure in a set pressure condition;
   a decompression valve for decompressing air pressure discharged from the air tank;
   a sprayer for spraying water in a particle state in order to make vapor contained in the supplied air;
   a distributor which uniformly distributes the decompressed air to a plurality of flow paths and has a control valve to open and close the flow paths;
   an air supply pipe which is buried in the soil where crops to be cultivated will be planted and has pores for supplying air passing through the distributor; and
   a controller which is connected to the compressor, the pressure gauge of the tank and the control valve of the distributor to control supply of the compressed air,
   wherein the air supply pipe includes:
   a first temporary pipe and a second temporary pipe which are buried to a low depth in the soil and are branched at different depths to directly supply air to the roots of the crops;
   a drain pipe and a liquid fertilizer supply pipe which are respectively piped to the first temporary pipe and the second temporary pipe to supply water and liquid fertilizer if necessary;
   a fixed pipe which is fixed and mounted in the soil to be deeper than the temporary pipes; and
   a nonwoven fabric which surrounds the outer circumference of the fixed pipe and a wire mesh put on the outer surface of the nonwoven fabric in order to block inflow of foreign matters into the fixed pipe and prevent blocking of the pores.

2. The agricultural air injection apparatus according to claim 1, further comprising:
   a water tank which is formed at an end portion of the fixed pipe and has a floating valve opened when water is stored to a predetermined water level;
   an underground water tank which has an air vent and a water level sensor to collect rainwater of the water tank;
   an underground water pump for transporting the collected water of the underground water tank when the water is at a predetermined water level or more; and
   drain pipes connected with the sprayer or the temporary pipes and the ground water tank in order to recycle the water collected in the ground water tank.

* * * * *